(12) United States Patent
Swan et al.

(10) Patent No.: US 6,788,309 B1
(45) Date of Patent: Sep. 7, 2004

(54) METHOD AND APPARATUS FOR GENERATING A VIDEO OVERLAY

(75) Inventors: Philip Swan, Richmond Hill (CA); John Haberfellner, Toronto (CA)

(73) Assignee: ATI International SRL, Christchurch (BB)

( * ) Notice: Subject to any disclaimer, the term of this patent is extended or adjusted under 35 U.S.C. 154(b) by 673 days.

(21) Appl. No.: 09/678,362

(22) Filed: Oct. 3, 2000

(51) Int. Cl.[7] .............................................. G09G 5/00
(52) U.S. Cl. ...................................................... 345/629
(58) Field of Search ......................... 345/340, 530–539, 345/541, 545, 547, 629, 660, 801, 815, FOR 136, 147–150, 216, 220

(56) References Cited

U.S. PATENT DOCUMENTS

| | | | | |
|---|---|---|---|---|
| 6,184,906 B1 | * | 2/2001 | Wang et al. | 345/532 |
| 2002/0009149 A1 | * | 1/2002 | Rodriguez et al. | 375/240.25 |
| 2002/0145610 A1 | * | 10/2002 | Barilovits et al. | 345/538 |

* cited by examiner

*Primary Examiner*—Matthew C. Bella
*Assistant Examiner*—G. F. Cunningham
(74) *Attorney, Agent, or Firm*—Vedder, Price, Kaufman & Kammholz, P.C.

(57) ABSTRACT

A method and apparatus utilizes a display engine scaler to access source image that is located in memory, such as a frame buffer and also controls a second scaler, such as a front end scaler of a 2D/3D engine, which also accesses the frame buffer and is capable of scaling from a frame buffer memory and storing the scaled image back to the frame buffer.

20 Claims, 5 Drawing Sheets

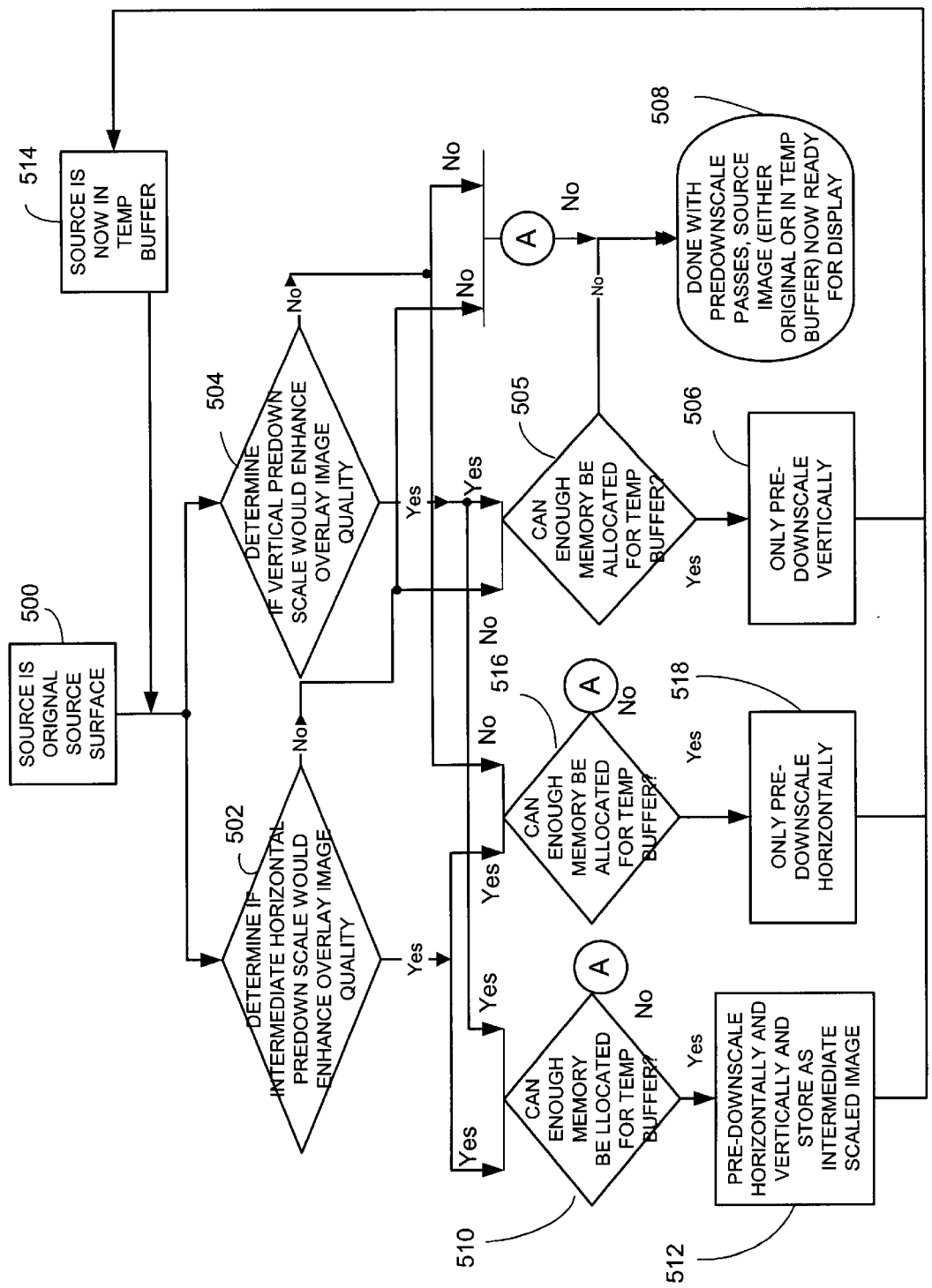

METHOD AND APPARATUS FOR GENERATING A VIDEO OVERLAY

FIELD OF THE INVENTION

The invention relates generally to methods and apparatus for providing video overlays and more particularly to methods and apparatus for providing video overlay using a plurality of scalers.

BACKGROUND OF THE INVENTION

Video overlays are typically provided by graphics accelerators or other processing devices to provide a video overlay within a graphic image on a computer screen, Internet appliance device, television, or any other suitable display device. The refresh rate of a display device is typically 50 Hz or more, although the rate at which images change may be as low as 24 Hz. Consequently, there is not much time to scale and display a video overlay. The problem is compounded particularly if the destination window of the video overlay is small vertically because the vertical active time of the destination window is a smaller fraction of the total refresh time. A scaling operation must be done even more rapidly while still allowing suitable image quality.

As is known, video overlay circuits and methods typically apply a scaling operation that requires the interpolation of pixels from a source window in both x and y directions to get high quality images at a different resolution. Ideally, a graphics processor will analyze more source pixels for each destination pixel when the destination window is smaller than the source window. Therefore, the processor typically needs more memory bandwidth and does more signal processing as the downscaling ratio increases.

One solution to reducing the memory bandwidth and signal processing has been to have the scaling process drop lines. For example, a scaling algorithm may read every other line of a source window. However, the resulting video overlay can have lower quality since valuable information is thrown away to meet timing requirements.

One example of a graphics processor is shown in FIG. 1. Typically, an application 100, such as a DVD driver, television display application or any other suitable application provides overlay control information to an overlay control driver associated with a graphics processing device or other suitable device. The overlay control information may include, for example, such information as the size of a new video overlay window, the video source base address, and any other suitable information. The overlay control driver 102 sets up hardware of a graphics controller or other suitable hardware to scale the video image stored in frame buffer 104 for display on display device 106. The overlay control driver 102 provides scaler control information 108 to a display engine 110. The scaler control information 108 can include, for example, source surface descriptor information such as the base address of the source image, the required pitch, a color format for the video overlay, a source window size and a destination window size and location, such as where on the display the destination surface (i.e. overlay) should appear.

The display engine 110 includes a scaler 112, often referred to as a back end scaler, that performs some type of spatial scaling in hardware. The scaler 112 in the display engine 110 scales data from the frame buffer and sends the scaled data directly to the monitor through display driver 114. The display engine 110 also includes the display driver 114, such as a CRT controller, and a primary surface reader 116. The primary surface reader 116, as known in the art, displays the primary surface 118 stored in frame buffer 104. The primary surface 118 is typically a graphics window or other suitable surface into which the video overlay is placed. The video overlay is the destination surface 120 which is a scaled version of the source window 122.

A 2D/3D engine 126 may also be present in the graphics controller which provides two-dimensional or three-dimensional rendering as required for video games or other suitable applications. The 2D/3D engine 126 includes a front end scaler 128. Unlike the back end scaler 112, the 2D/3D engine scales data from the frame buffer 104 and returns the scaled information back to the frame buffer 104 since it is typically not constrained by timing requirements associated with the refresh rate of the display device. Accordingly, the 2D/3D engine 126 is typically used to render images by a non-real time source such as a game, or any other suitable information. In contrast, the scaler 112 in the display engine is constrained by timing requirements associated with the display device 106. The pixel format of the primary surface 118 can have a lower color resolution than the pixel format of the source surface 130 for the display engine scaler. For example it may use only 8 or 16 bits to represent each pixel. Even if it uses 32 bits per pixel, it will typically use an RGB color space which cannot represent all of the colors of the YUV color space that is typically used for video. Therefore, if the 2D/3D engine 126 were used to color convert and draw the source surface 130 into the primary surface 118 directly there would be a loss of image quality. Accordingly, artifacts may sometimes be displayed. The 2D/3D engine 126 can perform a type of backup scaling and store the downscaled data in the primary surface 118. This will have the limitations mentioned above. For displaying two videos, such as a picture within a picture, the display engine scaler may be used as a primary scaler when each scaler is used to scale one of the video streams. However, a problem still occurs with downscaling using the 3D engine scaler 128 since the image is downscaled and stored to the primary surface 118 at low quality.

Consequently, a need exists for an improved method for generating a high quality downscaled video overlay for display on a display device.

BRIEF DESCRIPTION OF THE DRAWINGS

The invention will be more readily understood with reference to the following drawings wherein:

FIG. 5 is a flow chart illustrating in more detail, a method for generating a video overlay in accordance with one embodiment of the invention.

DETAILED DESCRIPTION OF A PREFERRED EMBODIMENT OF THE INVENTION

Generally, a method and apparatus utilizes a display engine scaler to access a source image that is located in memory, such as a frame buffer, and also controls a second scaler, such as a front end scaler of a 2D/3D engine, which also accesses the frame buffer and is capable of scaling from the frame buffer memory and storing the scaled image back to the frame buffer.

In one embodiment, the method and apparatus determines that a first video scaler, such as a backend scaler for the display engine, cannot perform acceptable video overlay scaling. This is determined by the inherent limitations in the specific implementation of the video scaler. The method and apparatus also determines whether there is sufficient memory available to another video scaler, such as the front end scaler of a 2D/3D engine for use as a temporary buffer to contain intermediate scaled overlay video data. The method and apparatus includes controlling the second video scaler to prescale the first image to produce the intermediate scaled video overlay and to store the intermediate scaled video overlay in a temporary buffer. The method and apparatus includes controlling the display engine containing the first video scaler to display the intermediate scaled overlay video data from the temporary buffer as the source surface. In another embodiment, multiple prescale passes are performed by the front end scaler, such as the 2D/3D engine scaler, with the final scaling performed by the backend scaler of the display engine. The multiple prescale passes are used to increase downscaling quality.

Figure 1:
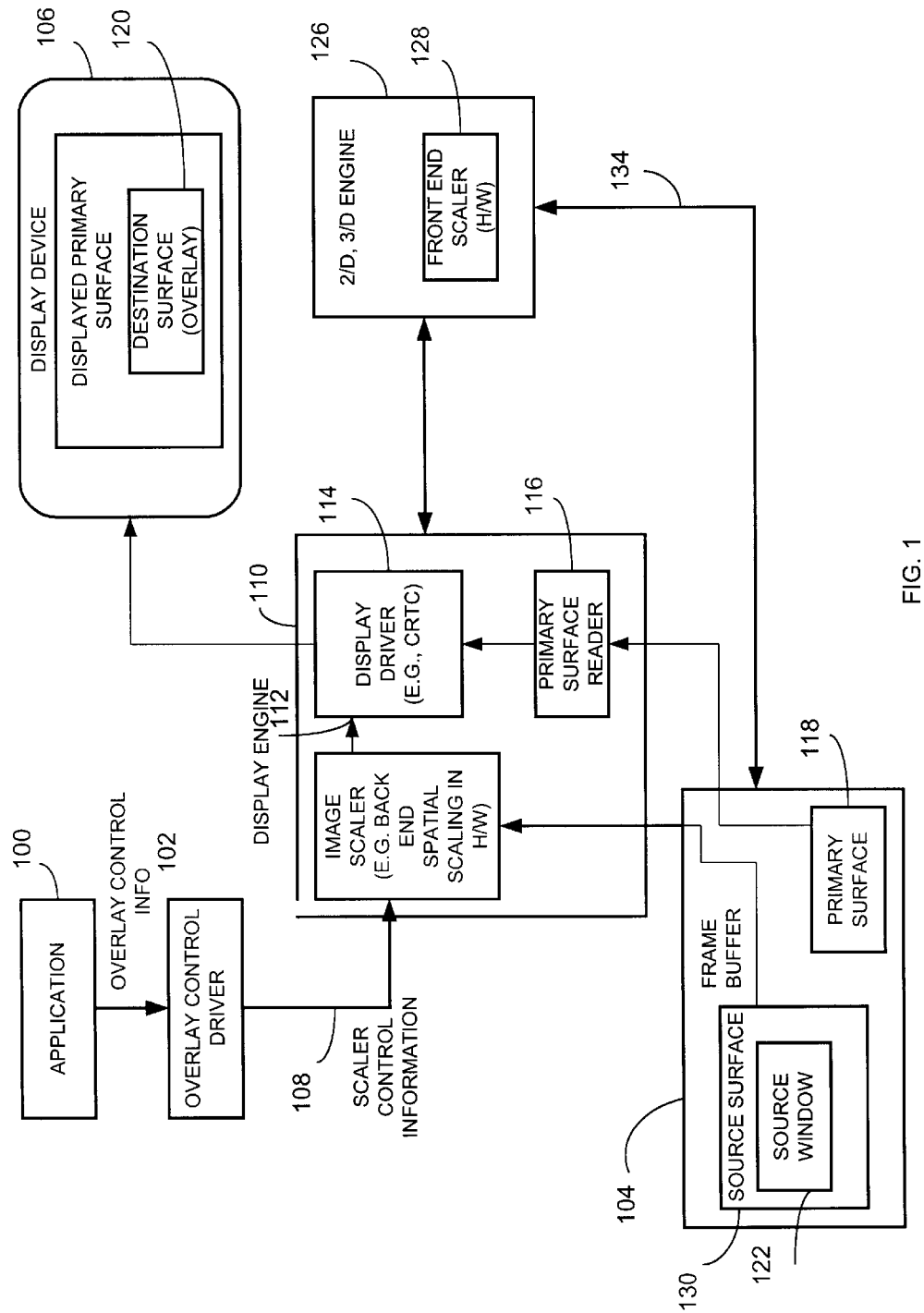
FIG. 1 is a block diagram illustrating one example of a conventional apparatus for providing a video overlay.
Figure 2:
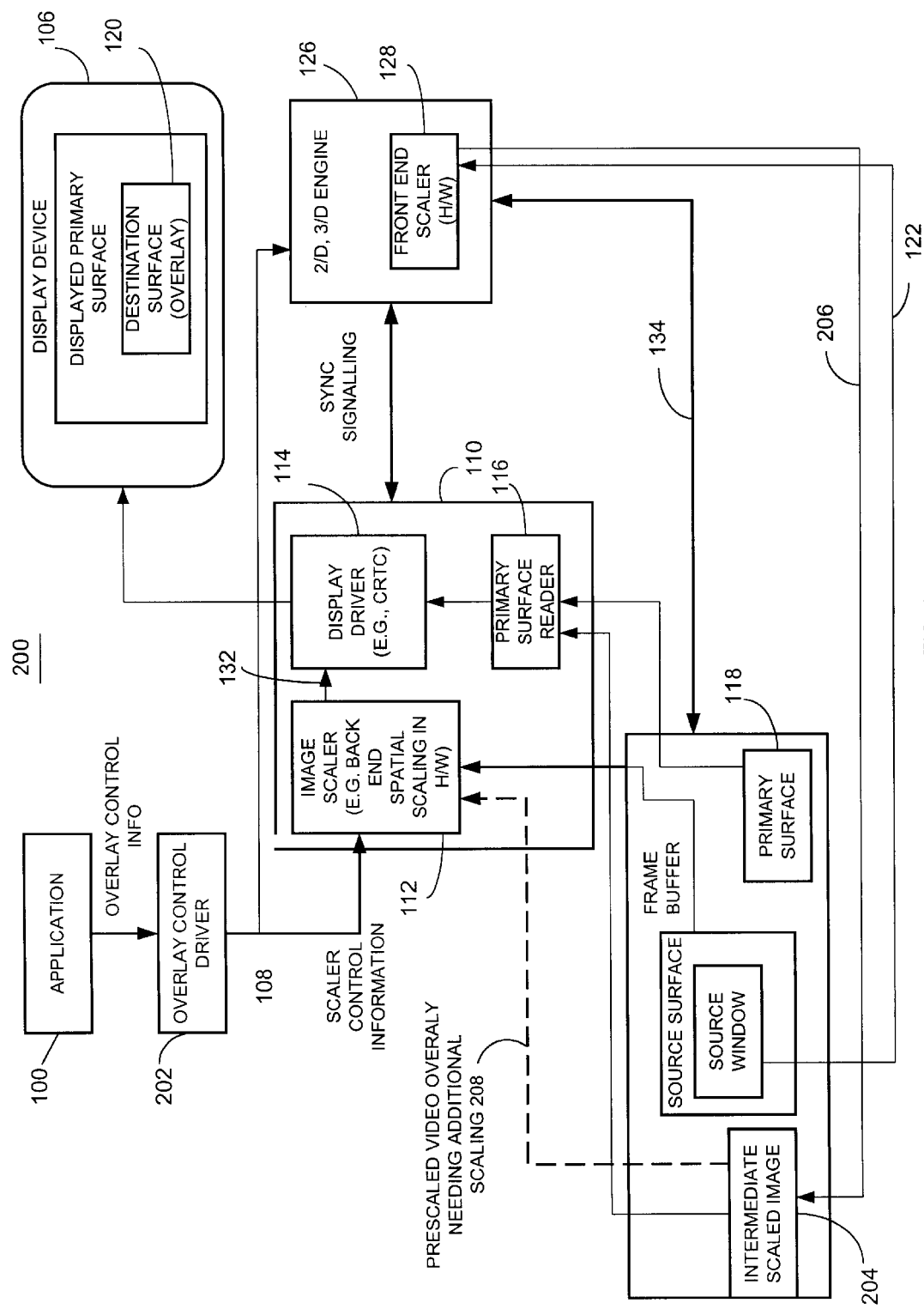
FIG. 2 is a block diagram illustrating one example of an apparatus for generating a video overlay in accordance with one embodiment of the invention.

FIG. 2 is a video overlay device 200 for generating a video overlay display for display on the display device 106. The video overlay device 200 includes a memory such as frame buffer 104 that contains source image 122 for display as an overlay on the display device 106. The source window image 122, as known in the art, may be the same size as the source surface 130 or a smaller size, as determined by the application. The video overlay device 200 includes the display engine 110 which may be, for example, a conventional display engine that includes a first video scaler 112 such as a backend scaler that provides spatial scaling, for example, in hardware. The scaler 112 provides the scaled image 132, such as a destination surface 120 to the display driver 114 for display on display device 106.

The video overlay device 200 also includes a second video scaler 128, such as a front end scaler in a 2D/3D engine that may be implemented, for example, in hardware. The second video scaler 128 is capable of obtaining video data from memory 104, through a suitable bus 134. The front end scaler 128 pre-scales the video data and restores the scaled video data back into a temporary buffer in the memory for display by the display engine 110. The temporary buffer may, if desired, overlap with memory used to store the source image.

The overlay control driver 202 when executed by a host processor, a graphics processor, or any other suitable logic, operates to determine that the first video scaler 112 cannot perform acceptable video overlay scaling. This may be done, for example, by determining if the image is downscaled and if the image scaler 112 can achieve the desired quality without assistance from the 2D/3D engine 126. The overlay control driver 202 also determines if there is sufficient memory 104 available to the second video scaler 128 for use as a temporary buffer 204 to contain intermediate scaled overlay video data. The overlay control driver 204 then controls the 2D/3D engine 126 to prescale the source image 122 to produce the intermediate scaled video overlay 206 and to store the intermediate scaled video 206 in the temporary buffer 204. The display engine 110 containing the video scaler 112 displays the intermediate scaled overlay video data 206 from the temporary buffer 204 to the primary surface reader 116 when no additional scaling is required.

The overlay control driver 202 which serves as control logic when executed, controls the front end scaler 128 of the 2D/3D engine to prescale the source image by, for example, a fixed scaling ratio in both a horizontal and vertical direction. The scaling ratio may be, for example, a 2:1 scaling ratio.

Where the prescaled or intermediate scaled overlay video data 206 requires further scaling by the backend scaler 112 the backend scaler 112 accesses the temporary buffer 204 as shown by dashed line 208. Accordingly, the front end scaler performs video overlay scaling and stores the scaled information back into the frame buffer after which time the backend scaler retrieves the information, if desired, from the intermediate or temporary buffer to perform additional scaling to further improve downscaling quality by taking advantage of the pixel depth of the backend scaler. The front end scaler 128 performs downscaling by performing one or more passes some of which can have a fixed down scale ratio. If desired, the front end scaler 128 prescales the source image 122 to produce the intermediate scaled video overlay 206 by performing a plurality of prescaled passes on a resulting image when a resulting image is in a destination raster, such as in the primary surface 118.

To conserve on the amount of memory used, the apparatus and method may overwrite the temporary buffer with source image 122, if desired. Also, depending upon the current state of the 2D/3D engine and front end scaler 128, the front end scaler 128 performs the scaling operations of the backend scaler 112 when the front end scaler is not busy performing prescaling operations. In this way, the front end scaler may be used to offload some of the loading associated with the scaler 112 to improve performance.

The front end scaler 128 also stores the intermediate scaled video overlay data 206 in the temporary buffer 204 in the primary surface memory 118, if desired. The advantage of this is that it allows the display of multiple video windows. One video window can be displayed by the image scaler 112 while another can be displayed by having the 2D/3D engine 126 write the scaled and possibly color converted data directly into the primary surface 118.

Figure 3:
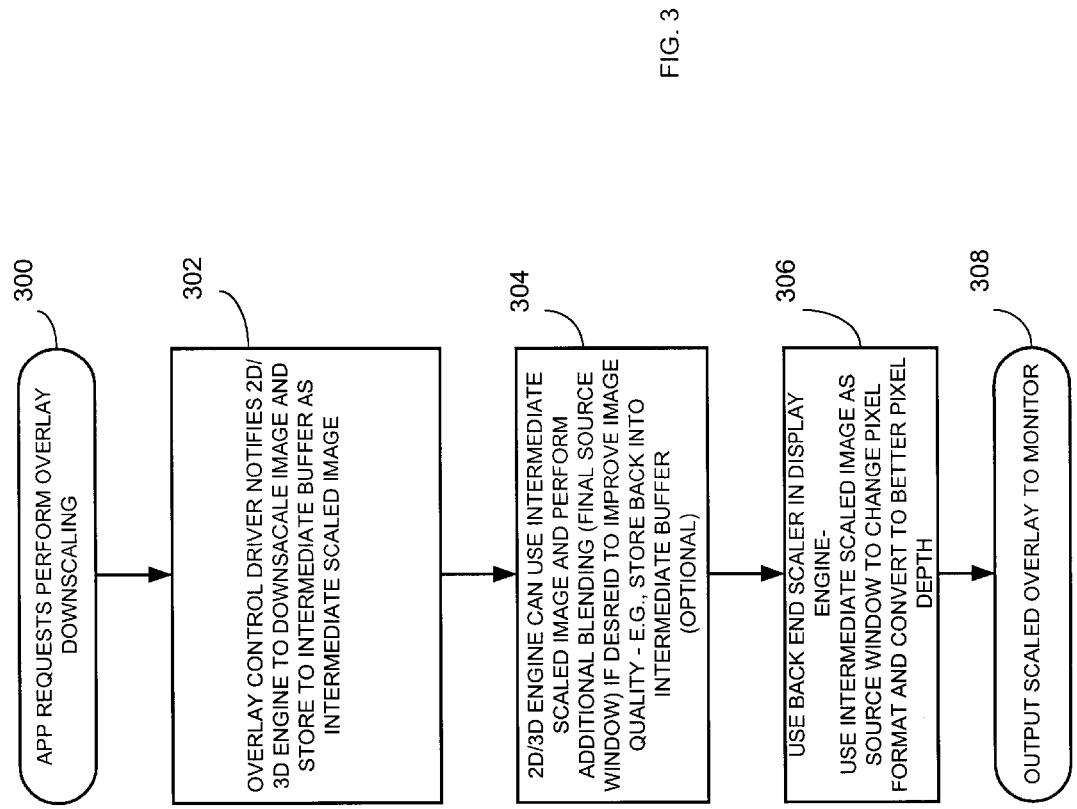
FIG. 3 is a flow chart illustrating one method for providing a video overlay for display on a display device in accordance with one embodiment of the invention.

FIG. 3 illustrates one example of a method for generating a video overlay. As shown in block 300, the method includes an application requesting that the graphics processor perform overlay downscaling. As shown in block 302, the method includes the overlay control driver 202 notifying the 2D/3D engine 126 to downscale the source image and to store the resulting downscaled image to the intermediate buffer 204 as the intermediate scaled image. The type of scaling is a blending type operation, as known in the art as interpolation, as opposed to a line dropping operation. However, it will be recognized that any suitable downscaling technique may be used. The resulting intermediate scaled overlay video data having been stored in intermediate memory is not stored in the primary surface memory 116 so that the image scaler 112 can be used to perform additional down scaling, if required, as well as color conversion.

As shown in block 304, the method includes, if desired, the overlay control driver 202 notifying the 2D/3D engine to perform multiple passes of blending (i.e., scaling) by the front end scaler 128 to improve quality and storing the final image into the intermediate buffer. This final image may then be output as the destination surface if desired. As shown in block 306, the method includes using the display engine scaler, namely, the backend scaler 112 to access the intermediate scaled overlay video data 206 from the temporary buffer 204 and use this information as a source window to change the pixel format and convert the pixels to a better pixel depth to improve the video overlay quality. As shown in block 308, the method includes outputting the scaled overlay to the display device 106 by the display driver 114.

Figure 4:
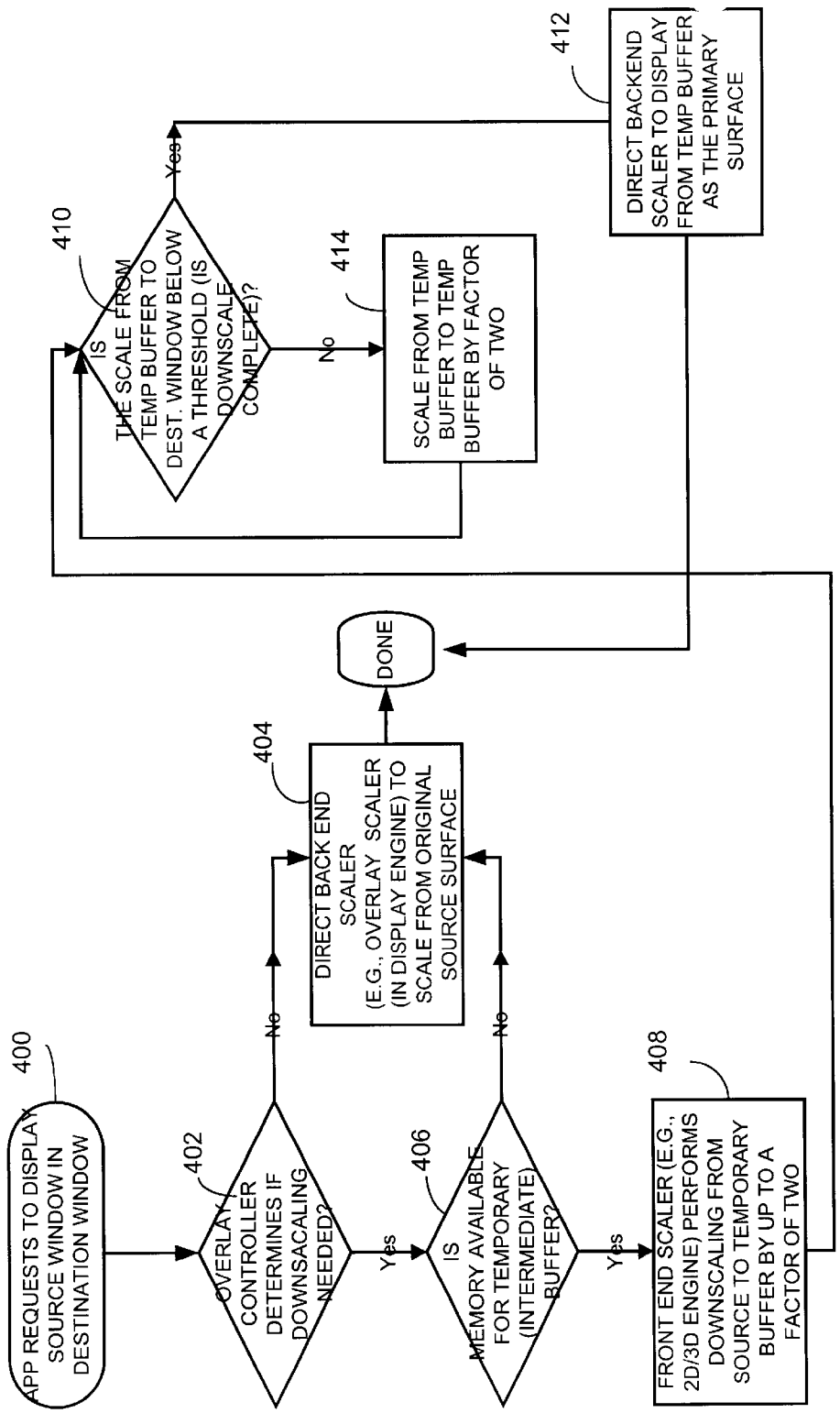
FIG. 4 is a flow chart illustrating one example of a method for providing a video overlay in accordance with one embodiment of the invention.

Referring to FIG. 4, a more detailed method for generating a video overlay will be described. As shown in block 400, the method includes receiving direction to generate a video overlay wherein the overlay includes a source image scaled on at least a viewable portion of the display device wherein the source image is contained in memory accessible to the display engine wherein the display engine includes a first video scaler (e.g., a back end scaler). In addition, the frame buffer is accessible by the front end scaler which is capable of obtaining video data from the frame buffer, scaling the video data and restoring the scaled video back into memory. Accordingly, the application requests to display a source window as a destination window on a display device. As shown in block 402, the method includes determining, by the overlay control driver, if downscaling is needed. This may be done, for example, by determining the size of the source surface and the destination surface size. As shown in block 404, if no downscaling is required, the method includes directing the backend scaler, namely the display engine scaler, to scale from the original source surface as opposed to scaling from an intermediate scaled image stored in an intermediate buffer.

However, if it is determined that downscaling is required, as shown in block 406, the method includes determining if there is sufficient memory available for an intermediate buffer. Accordingly, it is determined whether there is sufficient memory in the frame buffer for the second video scaler to use as a temporary buffer to contain intermediate scaled overlay video data. If there is insufficient frame buffer memory, the process includes directing the backend scaler to perform the scaling from the original source surface 130. However, if there is sufficient memory available, as shown in block 408, the method includes the front end scaler 128 performing scaling from the source surface to the temporary buffer.

As shown in block 410, the method includes determining if the scaled image from the temporary buffer to the destination window is below a threshold. For example, the overlay control driver 102 determines if the downscaled sizing of the image in the temporary buffer is equal to the destination surface size. If so, downscaling is completed and the method proceeds to block 412 where the overlay control driver 202 directs the backend scaler to display from the temporary buffer as the primary surface. However, if downscaling is not complete, the process proceeds to block 414 where the front end scaler 128 continues to scale from the temporary buffer back into the temporary buffer. This process continues until the up or downscaled image is complete.

Referring to FIG. 5, a more detailed method for generating a video overlay is described. As shown in block 500, if the source image is the original source surface, the overlay control driver 102 determines if intermediate horizontal and/or vertical pre-downscaling would enhance overlay image quality. This is determined by comparing the relative capabilities of the image scaler 112 and the front end scaler 128. For example if the number of horizontal and vertical taps provided by the display scaler is satisfactory, and if the bandwidth needs of the display scaler can be accommodated, then the display scaler can be used. Otherwise, if it is determined that an intermediate horizontal and/or vertical pre-downscale by the front end scaler would enhance the overlay image quality, as shown in blocks 502 and 504, the method includes determining if temporary buffer memory can be allocated as shown in blocks 510, 516 and 505. If so, the front end scaler 128 only pre-downscales, as shown in blocks 506, 512 or 518.

If it is determined that a prescaling operation, namely an intermediate horizontal pre-downscaling by the front end scaler would enhance image overlay quality, the method continues as shown in block 504 where simultaneously or in any suitable order, the overlay control driver 102 determines if vertical pre-downscaling would enhance overlay image quality. If neither horizontal pre-downscaling or vertical pre-downscaling would enhance image quality, the process ends, as shown in block 508. As shown in block 510, if both an intermediate horizontal pre-downscaling and a vertical pre-downscale would enhance overall image quality, the process includes determining if there is sufficient frame buffer memory as temporary buffer memory. If so, as shown in block 512, the front end scaler of the 2D/3D engine performs pre-downscaling in both the horizontal and vertical direction and stores the resulting images (the intermediate scaled overlay video data) in the temporary buffer. This image now serves as the source image which is in the temporary buffer, which is indicated in block 514. Multiple passes of prescaling may continue to occur as necessary as performed by the front end scaler.

As shown in block 516, if only horizontal pre-downscaling would enhance overall image quality, the method includes determining if there is sufficient frame buffer memory for temporary buffer memory. If so, the front end scaler 128 only pre-downscales horizontally, as shown in block 518. As noted above, if only a vertical pre-downscaling would enhance overall image quality, the method proceeds to blocks 504 and 506.

Accordingly, a method and apparatus utilizes both a display engine scaler and a 2D/3D engine to provide a video overlay. One advantage is that the apparatus and method overcomes the on-chip storage limitations of the display engine and the limited signal processing capability of the display engine scaler along with the limited time available due to the refresh rate of the display device. The 2D/3D scaler performs destination scaling for video overlay and writes the information into a temporary buffer. Other advantages will be recognized by those having ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for generating a video overlay for display on a display device comprising:
    receiving direction to generate a video overlay including a source image scaled on at least a viewable portion of a display device wherein the source image is contained in memory accessible to a display engine that includes a first video scaler and wherein the memory is accessible by a second video scaler capable of obtaining video data from the memory, scaling the video data and restoring the scaled video back into the memory for display by the display engine;
    determining that the first video scaler cannot perform acceptable video overlay scaling;
    determining that there is sufficient memory available, in the memory, to the second video scaler for use as a temporary buffer to contain intermediate scaled overlay video data;

controlling the second video scaler to prescale the source image to produce the intermediate scaled video overlay and to store the intermediate scaled video in the temporary buffer; and controlling the display engine containing the first video scaler to display the intermediate scaled overlay video data from the temporary buffer.

2. The method of claim 1 wherein the first video scaler is a backend scaler in a graphics processor and wherein the second video scaler is a front end scaler in the graphics processor.

3. The method of claim 1 wherein the step of controlling the second video scaler to prescale the source image includes prescaling the source image by a fixed scaling ratio in either or both a horizontal and vertical direction.

4. The method of claim 1 where the step of controlling the second video scaler to prescale the source image to produce the intermediate scaled video overlay and to store the intermediate scaled video in the temporary buffer, includes performing a plurality of prescale passes, by the second video scaler, to produce the intermediate scaled video overlay.

5. The method of claim 1 where the step of controlling the second video scaler to prescale the source image to produce the intermediate scaled video overlay and to store the intermediate scaled video in the temporary buffer, includes performing a plurality of prescale passes on a resulting image when the resulting image is in a destination raster.

6. The method of claim 1 including the step of deinterlacing interlaced video data prior to the prescaling performed by the second video scaler.

7. The method of claim 1 wherein the temporary buffer overlaps with memory used to store the source image.

8. The method of claim 1 including the step of controlling the second video scaler to perform first video scaler operations when the second video scaler is not busy performing prescaling operations.

9. The method of claim 1 including the step of storing the intermediate scaled video overlay stored in the temporary buffer in a primary surface memory.

10. The method of claim 1 wherein the memory is a frame buffer.

11. A video overlay device for generating a video overlay for display on a display device comprising:

memory containing a source image for display as an overlay on a display device;

a display engine, operatively coupled to the memory, that includes a first video scaler;

a second video scaler, also operatively coupled to the memory, capable of obtaining video data from the memory, scaling the video data and restoring the scaled video back into the memory for display by the display engine;

control logic operative to determine that the first video scaler cannot perform acceptable video overlay scaling to determine that there is sufficient memory available, in the memory, to the second video scaler for use as a temporary buffer to contain intermediate scaled overlay video data, to control the second video scaler to prescale the source image to produce the intermediate scaled video overlay and to store the intermediate scaled video in the temporary buffer; and wherein the display engine containing the first video scaler displays the intermediate scaled overlay video data from the temporary buffer.

12. The device of claim 11 wherein the first video scaler is a backend scaler in a graphics processor and wherein the second video scaler is a front end scaler in the graphics processor.

13. The device of claim 11 wherein the control logic controls the second video scaler to prescale the source image by a fixed scaling ratio in both a horizontal and vertical direction.

14. The device of claim 13 wherein the fixed scaling ratio is a 2:1 scaling ratio.

15. The device of claim 11 where the second video scaler prescales the source image to produce the intermediate scaled video overlay by performing a plurality of prescale passes to produce the intermediate scaled video overlay.

16. The device of claim 11 where the second video scaler prescales the source image to produce the intermediate scaled video overlay by performing a plurality of prescale passes on a resulting image when the resulting image is in a destination raster.

17. The device of claim 11 wherein the temporary buffer is memory used to also store the source image.

18. The device of claim 11 wherein the second video scaler perform first video scaler operations when the second video scaler is not busy performing prescaling operations.

19. The device of claim 11 wherein the memory is a frame buffer and wherein the second scaler stores the intermediate scaled video overlay stored in the temporary buffer in a primary surface memory.

20. The device of claim 11 wherein the memory is a frame buffer.

* * * * *